May 27, 1930.  G. M. NELL  1,760,276
STEEL PULLER
Filed July 30, 1926
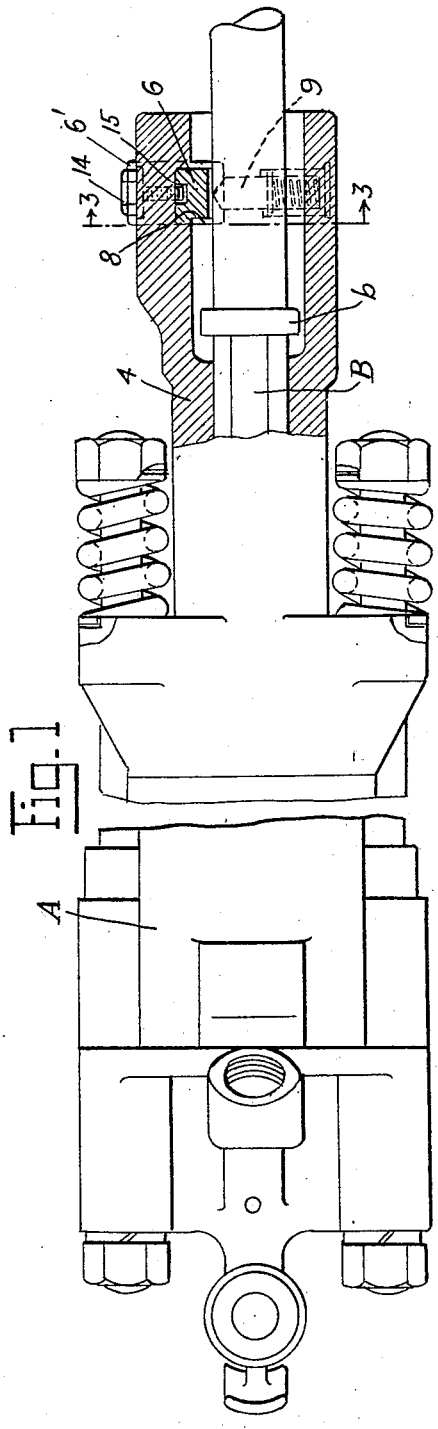
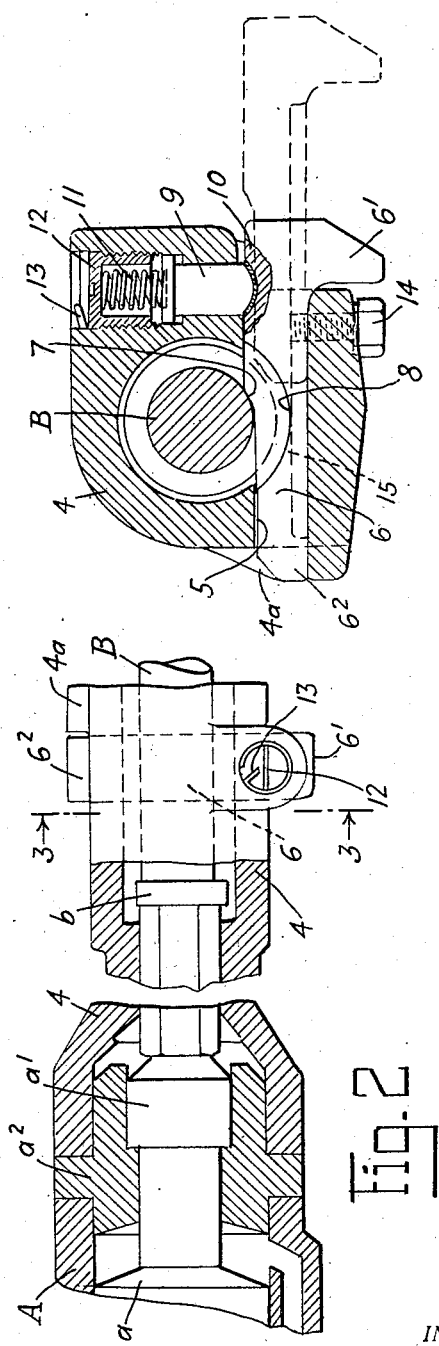
INVENTOR.
Gustave M. Nell
BY
Ira L. Nickerson
ATTORNEY.

Patented May 27, 1930

1,760,276

UNITED STATES PATENT OFFICE

GUSTAVE M. NELL, OF DETROIT, MICHIGAN, ASSIGNOR TO CHICAGO PNEUMATIC TOOL COMPANY, OF NEW YORK, N. Y., A CORPORATION OF NEW JERSEY

STEEL PULLER

Application filed July 30, 1926. Serial No. 125,905.

This invention relates to percussive machines arranged to impart hammer blows to a working tool having a shank extending partly within the machine and provided ordinarily with a collar or annular flange. More particularly the invention concerns means to retain the working tool in the machine, which means when used with drill steels and similar tools for drilling rock, pavement breaking, etc., are commonly referred to as steel pullers.

One object of the invention is to provide an improved retainer or puller for collared working tools. Another object is to facilitate the changing of working tools when desired but to prevent accidental releasing of the same. Other objects will be apparent from the detailed description which follows:

Fig. 1 is a side elevational view partly broken away of a percussive machine showing a portion of the tool chuck in section;

Fig. 2 is a fragmentary longitudinal vertical sectional view of certain of the parts shown in Fig. 1 at an angle of 90° thereto with the outer end of the tool chuck shown in elevation;

Fig. 3 is a transverse sectional view on an enlarged scale substantially on the line 3—3 of Figs. 1 and 2.

The embodiment of the invention chosen for the purpose of illustration is shown in connection with a pneumatic percussive machine A equipped with the usual front head or chuck member 4 in which is received the shank end B of a working tool, such as a drill steel formed with a collared or annularly flanged portion $b$. The end of the steel B receives the blow of the hammer piston $a$ (Fig. 2) through an anvil block $a'$ mounted in a guide member $a^2$ interposed between front head 4 and the cylinder of machine A.

The shank B has a range of limited movement within chuck 4 as indicated in Figs. 1 and 2 and means are provided on the chuck for cooperation with tool collar $b$ for retaining the working tool in place so that when machine A is to be transported from one position to another steel B may be pulled from its hole and carried along with the machine to the next position. To this end the chuck member 4 is enlarged somewhat toward its outer end and is provided with an off-center transverse bore 5 in which is slidably received a retainer or puller 6. Retainer 6 is in the form of a pin of rugged construction substantially rectangular in cross section (Fig. 1) and is formed with an enlarged stop head 6'. Retainer 6 is not of uniform width but is reduced somewhat beyond point 7 where it engages the shank of the working tool; bore 5 in chuck 4 conforms to the differential width of the retainer. As indicated retainer 6 is inserted at a point beyond collar $b$ so that in the event of the machine A being operated out of contact with its work, or when the machine is lifted, collar $b$ will engage the retainer 6 and prevent separation of tool B from machine A. To prevent withdrawal of pin 6 so as to release the tool, which might result from a striking of the pin by tool collar $b$, pin 6 has means automatically locking it in place in such an event. This means preferably takes the form of an arcuate groove 8 in the upper collar-facing side of the retainer (Figs. 1 and 3) within which the collar will seat so that retainer 6 cannot move in either direction.

Retainer 6 is arranged to be yieldingly held in operative position by a stop plunger 9 having a rounded head received in a shallow depression or socket 10 in the retainer. Plunger 9 slides in a bore in chuck 4 at right angles to retainer 6, being yieldingly held in engagement with the retainer by a coil spring 11 seated in a cap-shaped nut 12 threaded into the bore of the chuck and held therein by a retainer spring 13.

By preference retainer 6 extends beyond chuck 4 at its small end $6^2$. Since accidental contact of head or chuck 4 with the material worked upon might serve accidentally to dislodge retainer 6 by contact with end $6^2$, chuck 4 is formed with a protecting projection $4^a$ (Figs. 2 and 3) to prevent such action. This projection $4^a$ does not interfere, however, with the easy removal of retainer 6 by the operator which is accomplished by striking end $6^2$ to move the retainer far enough to force stop plunger 9 out of socket 10, whereupon large head 6' of retainer 6 is grasped to withdraw the same entirely or sufficiently to release the working tool.

In order to prevent retainer 6 from being lost and also to guard against delays which might result from attempts to insert it the wrong way in bore 5, suitable means may be provided for preventing the complete withdrawal of retainer 6. Such means may comprise a cap screw 14 (Figs. 1 and 3) projecting slightly within bore 5 and cooperating with a groove 15 in retainer 6. Fig. 3 indicates the operative position of retainer 6 in full lines and its inoperative or tool releasing position in broken lines.

From the above it will be apparent that the retainer or puller comprising the present invention is of simple and rugged construction well adapted to withstand hard use and abuse, that it is effectively protected against accidental displacement from vibration or from impact by the tool collar or by the material worked upon, that it can be used with machines which rotate the working tool, that the retainer pin may be movably secured to the tool chuck to prevent its loss, and that the device consists of few parts, which are cheap to manufacture and assemble.

While but one form of the invention has been herein shown and described, it is to be understood that the invention is not limited to the specific details thereof but covers all changes, modifications and adaptations within the scope of the appended claim.

I claim as my invention:

The combination with a chuck for a collared working tool, said chuck having a transverse differential opening therethrough intersecting the tool socket, of a retainer pin substantially rectangular in cross section and differential in size to fit said opening and arranged to engage said tool beyond its collar, the ends of said pin extending beyond said chuck and one end being formed as a hook-shaped stop to facilitate moving said pin, cooperating means on said chuck and pin including a stop screw on said chuck engaging a groove in said pin for limiting the movement of said pin within said opening and for preventing the withdrawal of said pin, a spring stop for holding said pin in tool retaining position, said pin having an arcuate groove in its upper face adapted to receive the tool collar and lock the pin against movement in said opening, and means preventing contact with the material worked upon by said tool from forcing said pin to tool releasing position comprising an extension on said chuck partly enclosing the smaller end of said pin.

Signed by me at Detroit, in the county of Wayne, and State of Michigan this 23 day of July, 1926.

GUSTAVE M. NELL.